(12) United States Patent
Yu et al.

(10) Patent No.: US 11,414,559 B2
(45) Date of Patent: Aug. 16, 2022

(54) MICROCAPSULE TYPE THERMOCHROMIC PIGMENT AND PREPARATION METHOD AND USE THEREOF, THERMOCHROMIC INK AND USE THEREOF

(71) Applicant: Wuhan Zhongke Advanced Material Technology CO., LTD, Hubei (CN)

(72) Inventors: Xuefeng Yu, Hubei (CN); Haisheng Liu, Hubei (CN)

(73) Assignee: WUHAN ZHONGKE ADVANCED MATERIAL TECHNOLOGY CO., LTD.

( * ) Notice: Subject to any disclaimer, the term of this patent is extended or adjusted under 35 U.S.C. 154(b) by 0 days.

(21) Appl. No.: 17/600,912

(22) PCT Filed: Apr. 1, 2020

(86) PCT No.: PCT/CN2020/082678
§ 371 (c)(1),
(2) Date: Oct. 1, 2021

(87) PCT Pub. No.: WO2020/200218
PCT Pub. Date: Oct. 8, 2020

(65) Prior Publication Data
US 2022/0145106 A1    May 12, 2022

(30) Foreign Application Priority Data
Apr. 2, 2019    (CN) .......................... 201910260938.X

(51) Int. Cl.
C09B 67/02      (2006.01)
C09D 11/17     (2014.01)
(Continued)

(52) U.S. Cl.
CPC .......... C09D 11/17 (2013.01); C09B 67/0097 (2013.01); C09D 11/322 (2013.01); C09D 11/00 (2013.01)

(58) Field of Classification Search
CPC ....... C09D 11/17; C09D 11/322; C09D 11/00; C09B 67/0097
See application file for complete search history.

(56) References Cited

U.S. PATENT DOCUMENTS

2004/0077743 A1* 4/2004 Senga ........................ C08J 3/21
                                                              522/64

FOREIGN PATENT DOCUMENTS

CN       1123806 A       6/1996
CN     102713762 A      10/2012
(Continued)

OTHER PUBLICATIONS

International Search Report dated Jul. 1, 2020 in International Application No. PCT/CN2020/082678, filed Apr. 1, 2020, 5 pages.
(Continued)

Primary Examiner — Yaovi M Ameh
(74) Attorney, Agent, or Firm — McDonnell Boehnen Hulbert & Berghoff LLP

(57) ABSTRACT

The disclosure provides a microcapsule type thermochromic pigment and a preparation method and use thereof, and a thermochromic ink and use thereof. The microcapsule type thermochromic pigment provided by the disclosure includes a core material and a wall material wrapping the core material, wherein the core material includes the following components: a leuco dye, a developer and stearic acid 2-[4-(phenylmethoxy)phenyl]ethyl ester, and the wall material is self-emulsifying polyurethane or self-emulsifying epoxy resin.

10 Claims, 7 Drawing Sheets

(51) Int. Cl.
    *C09D 11/322* (2014.01)
    *C09D 11/00* (2014.01)

(56) References Cited

FOREIGN PATENT DOCUMENTS

| CN | 102807853 | A |   | 12/2012 |          |
|----|-----------|---|---|---------|----------|
| CN | 105308150 | A | * | 2/2016  | B41M 5/305 |
| CN | 105308150 | A |   | 2/2016  |          |
| CN | 109943094 | A |   | 6/2019  |          |
| EP | 3 009 493 | A1 |  | 4/2016  |          |
| EP | 2 500 778 | B1 |  | 10/2017 |          |
| EP | 3 763 789 | A1 |  | 1/2021  |          |

OTHER PUBLICATIONS

Written Opinion dated Jul. 1, 2020 in International Application No. PCT/CN2020/082678, filed Apr. 1, 2020, 4 pages.

\* cited by examiner

MICROCAPSULE TYPE THERMOCHROMIC PIGMENT AND PREPARATION METHOD AND USE THEREOF, THERMOCHROMIC INK AND USE THEREOF

CROSS REFERENCE TO RELATED APPLICATION

This application is a U.S. National Phase of International Application No. PCT/CN2020/082678 filed on Apr. 1, 2020, which claims the priority of Chinese Patent Application No. CN201910260938.X, entitled "Microcapsule type thermochromic pigment and preparation method and use thereof, thermochromic ink and use thereof" filed with the China National Intellectual Property Administration on Apr. 2, 2019, both of which are incorporated herein by reference in their entirety.

TECHNICAL FIELD

The present disclosure relates to the technical field of thermochromic materials, and in particular to a microcapsule type thermochromic pigment and a preparation method and use thereof, and a thermochromic ink and use thereof.

BACKGROUND ART

The thermochromic pigment is a pigment that can repeatedly change its color as the temperature rises or falls. It contains invisible dyes/couplers and temperature control agents. The pigment can be used for making thermal erasable pens, rubbing pens, friction pens, thermal decolorization pen, and high temperature decolorization pen.

The thermochromic pigments in the prior art include the thermochromic color memory toner (CN102713762) of Pilot Ink Co., Ltd. and the reversible thermochromic microcapsules (CN102807853) of Beijing Moyike Technology Co., Ltd., but after the toner obtained from the former is synthesized, post-treatment processes such as centrifugal separation and drying are required before it can be used, which will produce waste water and pollute the environment. Although the reversible thermochromic microcapsules obtained by the latter can be directly used to prepare ink, their wall materials use urea-formaldehyde resin prepolymer, which contains carcinogenic formaldehyde, etc.

SUMMARY

An object of the present disclosure is to provide a microcapsule type thermochromic pigment and a preparation method and use thereof, a thermochromic ink and use thereof. The microcapsule type thermochromic pigment provided by the present disclosure can be used directly without post-treatment processes such as centrifugal separation and drying, and does not contain volatile toxic substances.

In order to achieve the above object, the present disclosure provides the following technical solution:

The present disclosure provides a microcapsule type thermochromic pigment, comprising a core material and a wall material wrapping the core material;

wherein the core material comprises the following components: a leuco dye, a developer, and a stearic acid 2-[4-(phenylmethoxy)phenyl]ethyl ester; and the wall material is self-emulsifying polyurethane or self-emulsifying epoxy resin.

In one embodiment, the core material comprises the following components in parts by weight: 3-10 parts of a leuco dye, 5-13 parts of a developer and 28-32 parts of stearic acid 2-[4-(phenylmethoxy)phenyl]ethyl ester.

In one embodiment, the core material further comprises an antioxidant; the amount of the antioxidant in the core material is 0.5-2 parts by weight.

In one embodiment, the particle size of the microcapsule type thermochromic pigment is 0.5-5 μm.

The present disclosure also provides a method for preparing the microcapsule type thermochromic pigment described in the above technical solution, comprising the following steps:

mixing raw materials of the core material, then melting to obtain a molten mixture;

mixing the molten mixture with raw material of the wall material and a cosolvent, then adding to water, subjecting them to an emulsification, to obtain an emulsion; the raw material of the wall material is self-emulsifying polyurethane prepolymer or self-emulsifying epoxy resin prepolymer;

mixing the emulsion with a crosslinking-curing agent and subjecting to a curing, to obtain a microcapsule type thermochromic pigment in the slurry.

In one embodiment, the emulsification is carried out at a temperature of 60-70° C., and the particle size of the emulsion is 0.5-5

In one embodiment, a mass ratio of the leuco dye to the raw material of the wall material, the cosolvent and the crosslinking-curing agent is 5-13:18-22:28-32:2-3.

The present disclosure also provides a thermochromic ink, comprising the microcapsule type thermochromic pigment described in the above technical solution or the microcapsule type thermochromic pigment prepared with the method described in the above technical solution.

In one embodiment, the thermochromic ink comprises the following components in parts by weight: 28-32 parts of a slurry of microcapsule type thermochromic pigment, 10-13 parts of a thickener, 0.3-0.6 parts of a lubricant, 0.1-0.2 parts of a biocide mildewcide, 0.2-0.5 parts of a rust and corrosion inhibitor, 18-22 parts of a moisturizer, 0.3-0.6 parts of a defoamer, 35-38 parts of water and 0.1-0.5 parts of a pH adjuster, wherein the content of the microcapsule type thermochromic pigment in the slurry of microcapsule type thermochromic pigment is 20-30 wt %.

The present disclosure also provides a use of the microcapsule type thermochromic pigment described in the above technical solution or the microcapsule type thermochromic pigment prepared by the method described in the above technical solution or of the thermochromic ink described in the above technical solution in thermal erasable pens, friction vanishing pens, frixion, thermal decolorization pen, and high temperature decolorization pen.

The present disclosure provides a microcapsule type thermochromic pigment, comprising a core material and a wall material wrapping the core material, wherein the core material comprises the following components: a leuco dye, a developer and a stearic acid 2[4-(phenylmethoxy)phenyl] ethyl ester; and the wall material is self-emulsifying polyurethane or self-emulsifying epoxy resin. The present disclosure uses self-emulsifying polyurethane or self-emulsifying epoxy resin as the wall material, so that the obtained microcapsule type thermochromic pigment can be stably dispersed in the slurry, and can be used directly without separating the microcapsule type thermochromic pigment. The wall material does not contain volatile and toxic substances such as formaldehyde. Furthermore, the wall material has good optical properties, and good transparency, and no white marks could be left on the paper after thermal decolorization or decolorization caused by frictional heat. Moreover, in the present disclosure, stearic acid 2-[4-(phenylmethoxy)phenyl]ethyl ester in the present application be used as a solvent and an ester compound with a function of controlling temperature, has the advantages of good thermal stability, temperature sensitivity and high color density, can be used as leuco dye for any color, and is low in price which significantly reduces the cost.

DETAILED DESCRIPTION OF THE EMBODIMENTS

Figure 1:
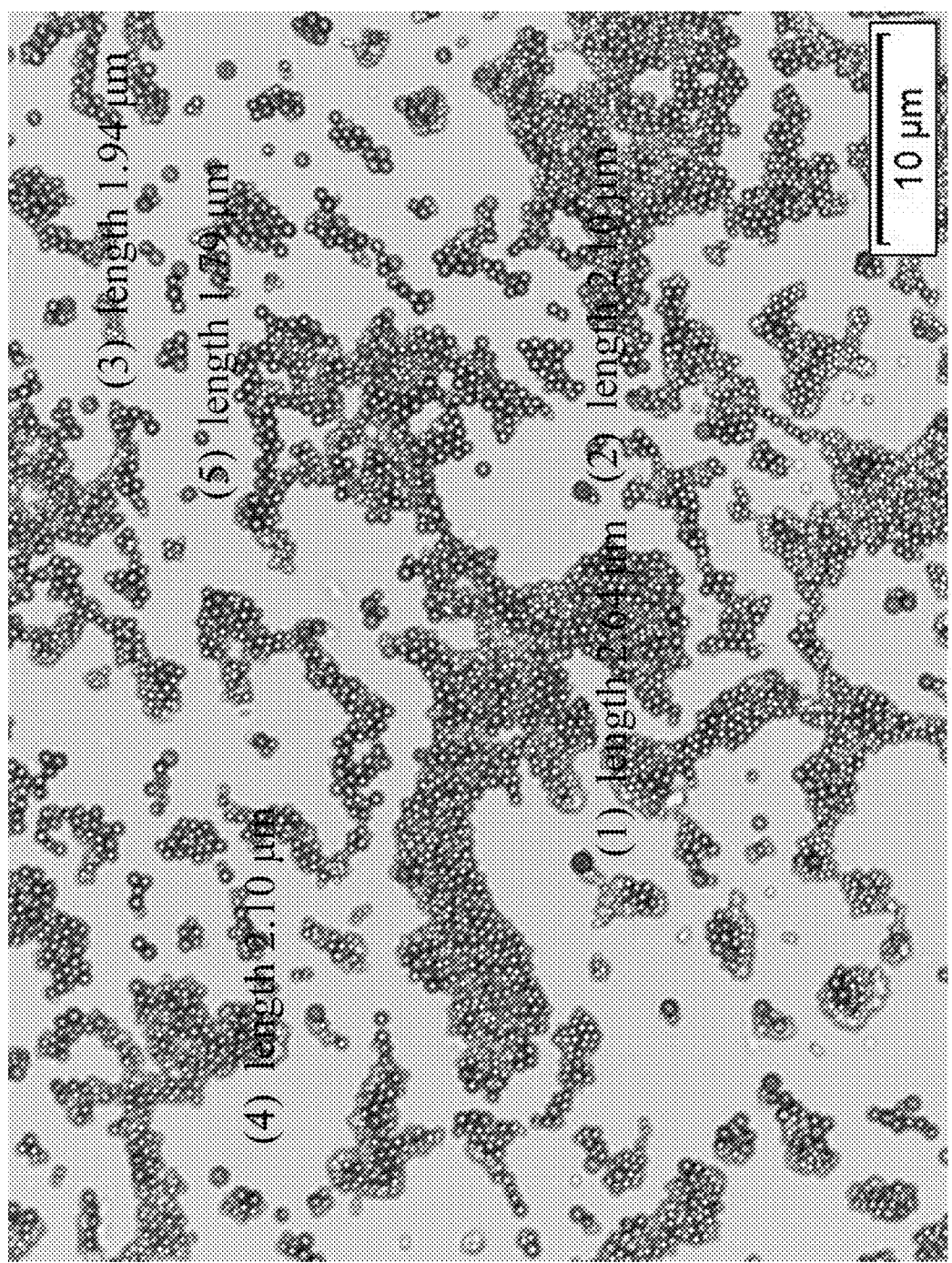
FIG. 1 is an optical microscope image of the thermochromic ink obtained in Example 1.

The present disclosure provides a microcapsule type thermochromic pigment, comprising a core material and a wall material wrapping the core material, wherein the core material comprises the following components: a leuco dye, a developer and stearic acid 2-[4-(phenylmethoxy)phenyl]ethyl ester; and the wall material is self-emulsifying polyurethane or self-emulsifying epoxy resin.

In the present disclosure, the core material preferably comprises the following components in parts by weight: 3-10 parts of a leuco dye, 5-13 parts of a developer and 28-32 parts of stearic acid 2-[4-(phenylmethoxy)phenyl] ethyl ester.

In the present disclosure, in parts by weight, the core material preferably comprises 3-10 parts of a leuco dye, more preferably 4-7 parts; said leuco dye preferably includes at least one of crystal violet lactone, 2-anilino-6-(dibutylamino)-3-methylfluoran, 3,3-bis(2-methyl-1-octyl-1H-indol-3-yl) phthalide and spiroisobenzofuran-1(3H),9(9H) xanthene-2-carboxylic acid-6-(diethylamino)-3-oxo-ethyl ester. When the leuco dye is crystal violet lactone, the complete color-disappeared temperature of the obtained microcapsule type thermochromic pigment is 60° C., and the complete color-appeared temperature thereof is 23° C.; when the leuco dye is 2-anilino-6-(dibutylamino)-3-methylfluoran, the complete color-disappeared temperature of the obtained microcapsule type thermochromic pigment is 63° C., and the complete color-appeared temperature thereof is −25° C.; when the leuco dye is 3,3-bis(2-methyl-1-octyl-1h-indol-3-yl)phthalide, the complete color-disappeared temperature of the obtained microcapsule type thermochromic pigment is 58° C., and the complete color-appeared temperature thereof is −18° C.

In the present disclosure, based on the parts by weight of the leuco dye, the core material preferably comprises 5-13 parts of the developer, and more preferably 6-10 parts; the developer preferably includes at least one of bisphenol AF, bisphenol A, bisphenol S, bisphenol AP, bisphenol F and developer D-8.

In the present disclosure, based on the parts by weight of the leuco dye, the core material preferably comprises 28-32 parts of stearic acid 2-[4-(phenylmethoxy)phenyl]ethyl ester, and more preferably 29-30 parts. In the present disclosure, stearic acid 2-[4-(phenylmethoxy)phenyl]ethyl ester, used as a solvent and an ester compound with a function of controlling temperature, has the advantages of good thermal stability, temperature sensitivity and high color density, and can be used as leuco dye for any color, and is low in price, which significantly reduces the cost.

In the present disclosure, the core material preferably further comprises an antioxidant. The antioxidant is preferably antioxidant 168(i.e. tris(2,4-di-tert-butyl)phenyl phosphite). Based on the parts by weight of the leuco dye, the weight parts of the antioxidant in the core material is preferably 0.5-2 parts, and more preferably 1-1.5 parts. In the present disclosure, the antioxidant can promote a closer combination of the leuco dye and the developer, so that the lactone ring of the leuco dye is opened to form a large quinone π bond, making colored group more stable and emitting bright color with higher concentration, which effectively prevents the lactone ring of the leuco dye from closing and avoids the disappearance of color of the microcapsule type thermochromic pigment (when the lactone ring of the leuco dye is closed, the microcapsule type thermochromic pigment becomes colorless from colored, exhibiting a decolorized state). In addition, the antioxidant 168 in the core material composition of the present disclosure also exhibits good light resistance, so that the handwriting written in the ink is not easy to fade when exposed to the light.

In the present disclosure, in one embodiment, the particle size of the microcapsule type thermochromic pigment is 0.5-5 μm.

The microcapsule type thermochromic pigment provided by the present disclosure is a reversible thermochromic microcapsule pigment, and its color disappears after being heated to a certain temperature, and its color appears after being frozen to the color-appeared temperature.

The present disclosure also provides a method for preparing the microcapsule type thermochromic pigment described in the above technical solution, comprising the following steps:

mixing raw materials of the core material, and then melting to obtain a molten mixture;

mixing the molten mixture with raw material of the wall material and a cosolvent, then adding to water, and subjecting them to an emulsification, to obtain an emulsion, wherein the raw material of the wall material is self-emulsifying polyurethane prepolymer or self-emulsifying epoxy resin prepolymer;

mixing the emulsion with a crosslinking-curing agent and subjecting to a curing, to obtain a microcapsule type thermochromic pigment in the slurry.

In the present disclosure, the leuco dye, the developer and stearic acid 2-[4-(phenylmethoxy) phenyl]ethyl ester are mixed and then melten to obtain a molten mixture.

After the molten mixture is obtained, the molten mixture is mixed with raw material of the wall material and the cosolvent, and then the resulting mixture is added to water, and they are subjected to a emulsification to obtain an emulsion, wherein the raw material of the wall material is self-emulsifying polyurethane prepolymer or self-emulsifying epoxy resin prepolymer. In the present disclosure, after the molten mixture is obtained, the raw material of the wall material and the cosolvent are added, and finally they are added into water. Such operation can reduce the contact between the raw material of the wall material and water.

In the present disclosure, the raw material of the wall material is self-emulsifying polyurethane prepolymer (also called waterborne polyurethane prepolymer) or self-emulsifying epoxy resin prepolymer (also called waterborne epoxy resin prepolymer); the self-emulsifying polyurethane prepolymer and self-emulsifying epoxy resin prepolymer are viscous transparent liquid or paste. In the present disclosure, in one embodiment, the epoxy equivalent of the self-emulsifying epoxy resin prepolymer is 100-200. In the present disclosure, there is no particular limitations to the source of the self-emulsifying polyurethane prepolymer or self-emulsifying epoxy resin, which can be obtained with a conventional preparation method. In the examples of the present disclosure, the self-emulsifying polyurethane prepolymer was prepared with the method referring to the prior art "Synthesis and Characterization of Two-Component Waterborne Polyurethane Adhesive" (Zheng Yanqing et al., Journal of Xiamen University (Natural Science Edition), September 2014); and the self-emulsifying epoxy resin prepolymer was purchased from Shenzhen Kaisite New Materials Co., Ltd.

In the present disclosure, in one embodiment, the cosolvent is ethyl acetate or chloroform. In one embodiment, a mass ratio of the leuco dye to the cosolvent is 5-13:28-32, and more preferably 7-10:28-32. In the present disclosure, the main function of the cosolvent is to dilute the raw material of the wall material and to reduce the viscosity, so that the raw material of the wall material and the molten mixture are mixed well to be uniform; at the same time, the cosolvent can prevent the direct contact between the self-emulsifying polyurethane prepolymer and the air to avoid the reaction between the self-emulsifying polyurethane prepolymer and the moisture in the air, slowing down the side reaction of the self-emulsifying polyurethane prepolymer and water during the emulsification process.

In the present disclosure, in one embodiment, the emulsification is carried out at a temperature of 60-70° C., and in another embodiment the particle size of the emulsion is 0.5-5 μm. In one embodiment, the emulsification is carried out by a high-speed stirring, preferably with a speed of 3000-5000 r/min, and preferably for 10-40 min. In the present disclosure, in one embodiment, water is heated to a temperature required for emulsification before use.

In the present disclosure, in one embodiment, the mass ratio of the leuco dye to the raw material of the wall material is 5-13:18-22, and more preferably 7-10:18-22.

After the emulsion is obtained, in the present disclosure, the emulsion is mixed with a crosslinking-curing agent and they are subjected to a curing to obtain a microcapsule type thermochromic pigment in the slurry. During the curing process, the self-emulsifying polyurethane prepolymer or self-emulsifying epoxy resin prepolymer migrates from the oil phase to the interface; the crosslinking-curing agent migrates from the water phase to the interface; a polymerization reaction occurs at the interface, making the leuco dye, the developer, and stearic acid 2-[4-(phenylmethoxy)phenyl]ethyl ester be wrapped inside, to form microcapsules.

In the present disclosure, in one embodiment, the crosslinking-curing agent is selected from the group consisting of diethylene triamine, ethylene diamine, triethylene tetraamine, tetraethylene pentamine or 593 curing agent (the adduct of diethylene triamine and butyl glycidyl ether).

In the present disclosure, the mass ratio of the leuco dye to the crosslinking-curing agent is preferably 5-13:2-3, and more preferably 7-10:2-3.

In one embodiment of the present disclosure, the curing comprises a first-stage curing and a second-stage curing, wherein the first-stage curing is carried out at a temperature of 60-70° C., preferably for 0.8-1.2 h, and the second-stage curing is carried out at a temperature of 75-85° C., preferably for 1.8-2.2 h.

In the present disclosure, the microcapsule type thermochromic pigment does not need to be separated from the slurry, and can be directly frozen to a colored state and used to prepare ink.

The present disclosure uses self-emulsifying polyurethane or self-emulsifying epoxy resin as the wall material. The wall material has good optical properties, good transparency, and no white marks could be left on the paper after thermal decolorization or decolorization caused by frictional heat. However, the wall materials of the thermochromic pigments obtained by the prior art CN102713762 and CN102807853 are whitish, and have a low transparency, and white marks could be left on the paper after thermal decolorization or decolorization caused by frictional heat.

The present disclosure also provides a thermochromic ink, comprising the microcapsule type thermochromic pigment described in the above technical solution or the microcapsule type thermochromic pigment obtained by the preparation method described in the above technical solution.

In one embodiment of the present disclosure, the thermochromic ink comprises the following components in parts by weight: 28-32 parts of microcapsule type thermochromic pigment, 10-13 parts of a thickener, 0.3-0.6 parts of a lubricant, 0.1-0.2 parts of a biocide mildewcide, 0.2-0.5 parts of a rust and corrosion inhibitor, 18-22 parts of a moisturizer, 0.3-0.6 parts of a defoamer, 35-38 parts of water and 0.1-0.5 parts of a pH adjuster, wherein the amount of the microcapsule type thermochromic pigment in the slurry of the microcapsule type thermochromic pigment is 20-30 wt %.

In one embodiment of the present disclosure, the thickener is an alkali swelling associative acrylate emulsion thickener. a polyether polyurethane thickener or xanthan gum. In one embodiment of the present disclosure, the alkali swelling associative acrylate emulsion thickener is the alkali swelling associative acrylate emulsion thickener with a mass concentration of 10%. In one embodiment of the present disclosure, the alkali swelling associative acrylate emulsion thickener with a mass concentration of 10% is prepared by the method comprising the following steps:

mixing an alkali swelling associative acrylate emulsion thickener with water, then dripping an alkaline neutralizer until that the value of pH is 8.0-9.0, and stirring for 2-3 hours, to obtain the alkali swelling associative acrylate emulsion thickener with a mass concentration of 10%.

In the present disclosure, when the alkaline neutralizer is added, as the degree of neutralization increases, a large number of carboxyl groups on the polymer chain are neutralized by the alkaline neutralizer to form a salt, generating electrostatic repulsion and hydration in the molecule. The macromolecular structure gradually stretches from the curled state, adsorbing a large amount of surrounding water molecules, reducing the amount of free water, and increasing the viscosity; at the same time, in the main structure with acrylate as the main chain, because the introduced reactive associative monomers with surface activity participates in the copolymerization, side chain is grafted with a long chain with a surface-active structure, and there are also both hydrophobic group(s) and hydrophilic group(s) in the long chain structure, and thus it also has surface activity.

In one embodiment of the present disclosure, the alkaline neutralizer is selected from the group consisting of ammonia, triethanolamine or ethylene glycol amine. In another embodiment, the mass concentration of the ammonia is 28%.

In one embodiment of the present disclosure, the lubricant is water-soluble phosphate MOA-3P. In one embodiment, the biocide mildewcide is iodopropynyl butylcarbamate (IPBC). In one embodiment, the rust and corrosion inhibitor is at least one selected from the group consisting of benzotraizole, octyl benzotriazole, dodecyl benzotriazole, N,N-bis (benzotriazole methylene) dodecylamine, methyl benzotriazole and naphtho triazole. In one embodiment, the moisturizer is glycerin. In one embodiment, the defoamer is an organic silicon defoamer. In one embodiment, the pH adjuster is triethanolamine.

The present disclosure also provides a method for preparing the above-mentioned thermochromic ink, which comprises the following steps:

freezing a slurry of the microcapsule type thermochromic pigment to a colored state, to obtain a colored slurry of the microcapsule type thermochromic pigment;

mixing the colored slurry of the microcapsule type thermochromic pigment, a thickener, water, a lubricant, a biocide mildewcide, a rust and corrosion inhibitor and a moisturizer to obtain a mixture; adjusting pH of the mixture to 8.0-9.0 with pH adjuster; then adding a defoamer and stirring for 0.5-1 h, to obtain the thermochromic ink.

In the present disclosure, the pH of the mixture is adjusted to 8.0-9.0 with the pH adjuster, so that the resulting ink is weakly alkaline, which can prevent corrosion of metal pen nibs such as steel or copper pen nibs.

The present disclosure also provides a use of the microcapsule type thermochromic pigment described in the above technical solution or the microcapsule type thermochromic pigment obtained by the preparation method described in the above-mentioned technical solution, or a use of the thermochromic ink described in the above technical solution in thermal erasable pens, friction vanishing pens, frixion, thermal decolorization pen and high temperature decolorization pen.

The microcapsule type thermochromic pigment and preparation method and use thereof and the thermochromic ink and use thereof provided by the present disclosure will be described in detail with reference to examples below, but they should not be understood as limiting the protection scope of the present disclosure.

Example 1

(1) Preparation of a slurry of microcapsule type thermochromic pigment:

In terms of parts by weight, 4 parts of crystal violet lactone, 6 parts of bisphenol AF, 1 part of antioxidant 168 and 30 parts of stearic acid 2-[4-(phenylmethoxy)phenyl] ethyl ester were mixed, and heated to melt, to obtain a molten mixture;

20 parts of a self-emulsifying polyurethane prepolymer and 30 parts of ethyl acetate were added to the molten mixture, and the resulting solution was used as the oil phase. The oil phase was put into 200 parts of deionized water at a temperature of 65° C., and an emulsification was carried out by a high-speed stirring at a speed of 3500 r/min for 15 min to disperse the oil phase into tiny oil droplets, to obtain an emulsion with a particle size of 1-5 μm;

the emulsion and 2 parts of diethylenetriamine were mixed and maintained at a constant temperature of 65° C. with stirring for 1 h, and then heated to 80° C. to be subjected to curing for 2 h, to obtain the slurry of microcapsule type thermochromic pigment.

(2) Preparation of a thermochromic ink:

an alkali swelling associative acrylate emulsion thickener was added into deionized water, then ammonia water with a mass concentration of 28% was dripped while stirring to adjust pH value to 8.0, and the resulting mixture were stirred for another 2 h, to obtain the alkali swelling associative acrylate emulsion thickener with a mass concentration of 10%;

the slurry of microcapsule type thermochromic pigment obtained in step (1) was frozen to a colored state, to obtain a colored slurry of microcapsule type thermochromic pigment;

30 parts of the colored slurry of microcapsule type thermochromic pigment, 12 parts of the alkali swelling associative acrylate emulsion thickener with a mass concentration of 10%, 36.5 parts of deionized water, 0.5 parts of water-soluble phosphate MOA-3P, 0.1 parts of iodopropynyl butylcarbamate (IPBC), 0.4 part of benzotriazole and 20 parts of glycerin were mixed, then 0.2 parts of triethanolamine was added to adjust the pH value to 8.0, and then 0.5 parts of an organic silicone defoamer was added and stirred for 0.5 h to obtain the thermochromic ink.

The thermochromic ink slide glass sample obtained in this example was characterized by an optical microscope, wherein the thermochromic ink slide glass sample was prepared by diluting the thermochromic ink obtained in this example to 5 times with deionization water, and then applying the diluted thermochromic ink onto the slide glass. The results were shown in FIG. 1. Five of the microcapsules were tested for their particle sizes, and they were 2.64 μm, 2.10 μm, 1.94 μm, 2.10 μm and 1.79 μm respectively. It can be seen that the microcapsule type thermochromic pigment in the thermochromic ink obtained in this example was in a form of a regularly shaped sphere with an excellent dispersion, and had relatively uniform particle size distribution.

Figure 2:
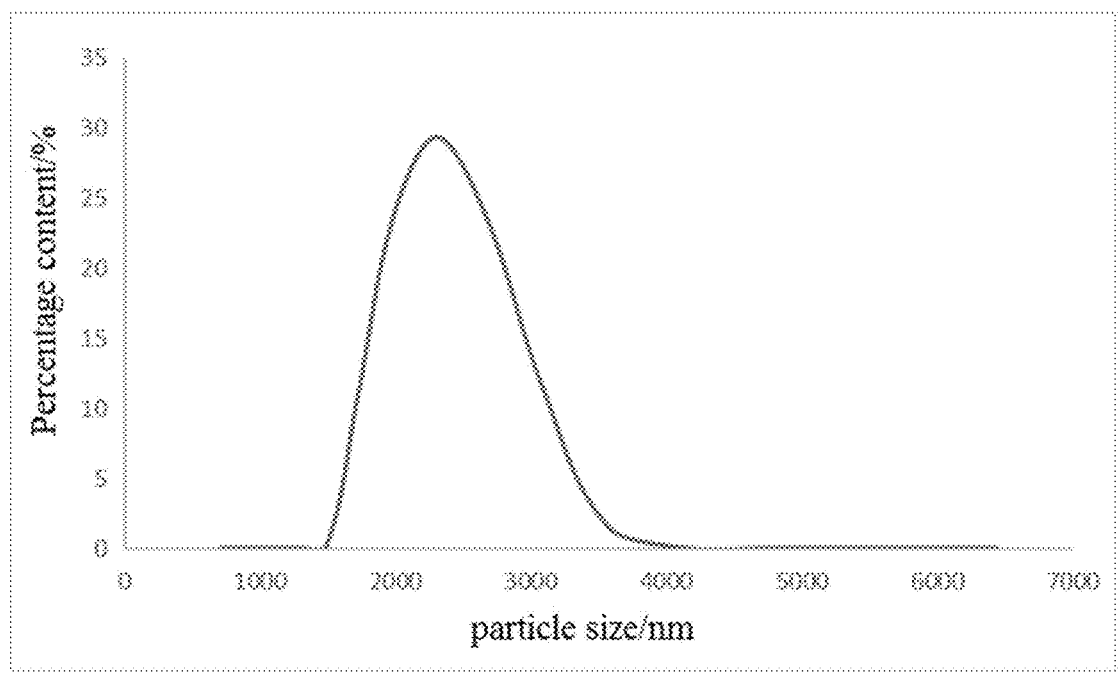
FIG. 2 is a diagram of particle size distribution of the microcapsule type thermochromic pigment obtained in Example 1.

The particle size of the microcapsule type thermochromic pigment in the slurry of microcapsule type thermochromic pigment obtained in step (1) of this example was determined by a laser particle size analyzer, and the result was shown in FIG. 2. The particle size of the microcapsule thermochromic pigment was 1-4 μm, and the average particle size was 2.36 μm.

The microcapsule type thermochromic pigment obtained in this example was a reversible thermochromic pigment, which can be adjusted to blue or colorless by changing temperature, and the complete color-disappeared temperature was 60° C., and the complete color-appeared temperature was -23° C.

Example 2

(1) Preparation of a slurry of microcapsule type thermochromic pigment:

In terms of parts by weight, 6 parts of 2-anilino-6-(dibutylamino)-3-methylfluoran, 10 parts of bisphenol AF, 1 part of antioxidant 168 and 30 parts of stearic acid 2-[4-(phenylmethoxy) phenyl]ethyl ester were mixed, and heated to melt, to obtain a molten mixture;

20 parts of a self-emulsifying polyurethane prepolymer and 30 parts of ethyl acetate were added to the molten mixture, and the resulting solution was used as the oil phase. The oil phase was put into 200 parts of deionized water at a temperature of 60° C., and an emulsification was carried out by a high-speed stirring at a speed of 5000 r/min for 20 min to disperse the oil phase into tiny oil droplets to obtain an emulsion with a particle size of 0.5-5 µm; and the emulsion and 2 parts of diethylenetriamine were mixed and maintained at a constant temperature of 60° C. with stirring for 1 h, then heated to 80° C. to be subjected to curing for 2 h, to obtain the slurry of microcapsule type thermochromic pigment.

(2) Preparation of a thermochromic ink:

an alkali swelling associative acrylate emulsion thickener was added to deionized water, then ammonia water with a mass concentration of 28% was dripped while stirring to adjust pH value to 8.0, and the resulting mixture were stirred for another 2 h, to obtain alkali swelling associative acrylate emulsion thickener with a mass concentration of 10%;

the slurry of microcapsule type thermochromic pigment obtained in step (1) was frozen to a colored state, to obtain a colored slurry of microcapsule type thermochromic pigment;

30 parts of the colored slurry of microcapsule type thermochromic pigment, 12 parts of the alkali swelling associative acrylate emulsion thickener with a mass concentration of 10%, 36.5 parts of deionized water, 0.5 parts of water-soluble phosphate MOA-3P, 0.1 parts of iodopropynyl butylcarbamate (IPBC), 0.4 part of benzotriazole, and 20 parts of glycerin were mixed, then 0.3 parts of triethanolamine was added to adjust the pH value to 8.0, and then 0.5 parts of an organic silicone defoamer was added and stirred for 0.5 h to obtain the thermochromic ink.

Figure 3:
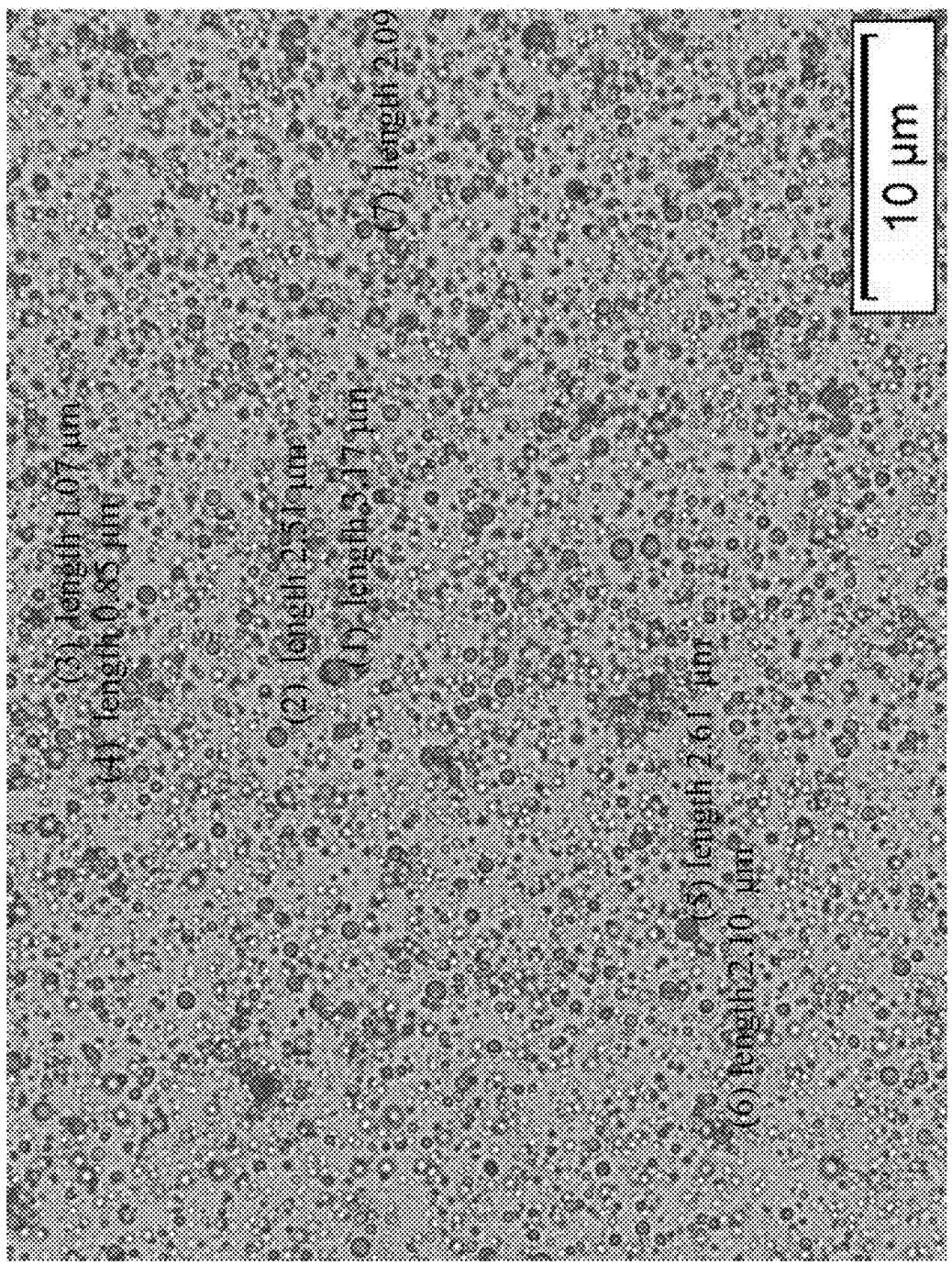
FIG. 3 is an optical microscope image of the thermochromic ink obtained in Example 2.

The thermochromic ink slide glass sample obtained in this example was characterized by an optical microscope, wherein the thermochromic ink slide glass sample was prepared by diluting the thermochromic ink obtained in this example to 5 times with deionization water, and then applying the diluted thermochromic ink onto the slide glass. The results were shown in FIG. 3. Seven of the microcapsules were tested for their particle sizes, and they were 3.17 µm, 2.51 µm, 1.07 µm, 0.83 µm, 3.61 µm, 2.10 µm and 2.09 µm respectively. It can be seen that the morphology of the microcapsule type thermochromic pigment in the thermochromic ink obtained in this example was a regularly shaped sphere with an excellent dispersion, and had a relatively uniform particle size distribution.

Figure 4:
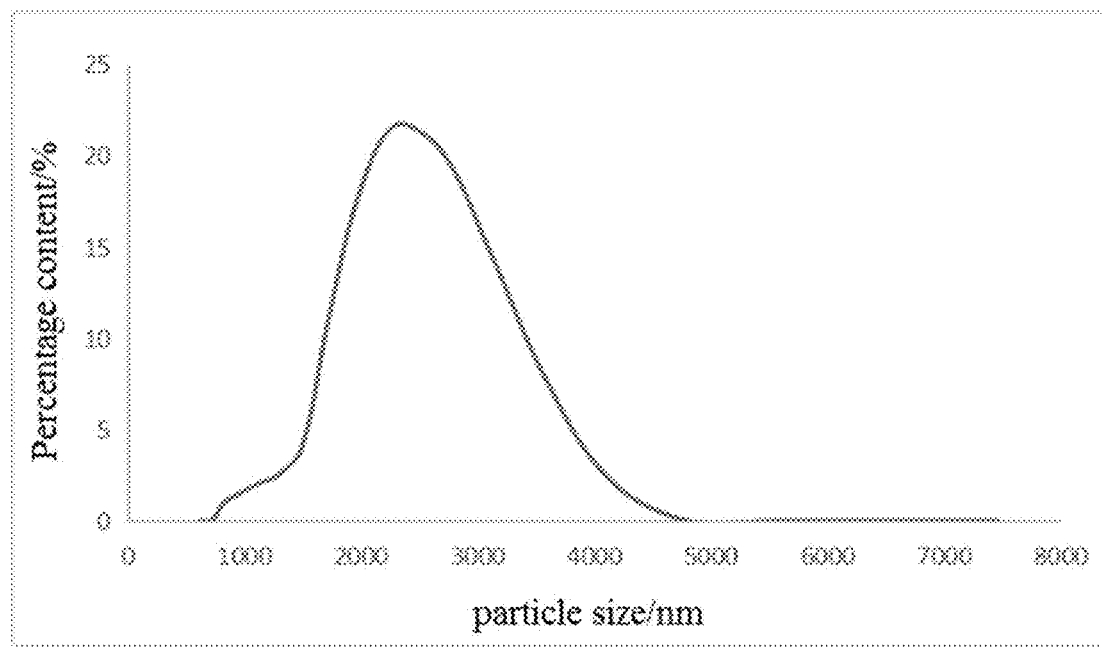
FIG. 4 is a diagram of particle size distribution of the microcapsule type thermochromic pigment obtained in Example 2.

The particle size of the microcapsule type thermochromic pigment in the slurry of microcapsule type thermochromic pigment obtained in step (2) of this example was determined by a laser particle size analyzer. The result was shown in FIG. 4. The particle size of the microcapsule thermochromic pigment was 0.5-5 µm, and the average particle size was 2.48 µm.

The microcapsule type thermochromic pigment obtained in this example was a reversible thermochromic pigment, which can be adjusted to black or colorless by changing temperature, and the complete color-disappeared temperature was 63° C., and the complete color-appeared temperature was −25° C.

Example 3

(1) Preparation of a slurry of microcapsule type thermochromic pigment:

In terms of parts by weight, 4 parts of 3,3-bis(2-methyl-1-octyl-1H-indol-3-yl) phthalide, 1 part of spiroisobenzofuran-1(3H),9(9H)xanthene-2-carboxylic acid-6-(diethylamino)-3-oxo-ethyl ester, 8 parts of bisphenol AF, 1 part of antioxidant 168 and 30 parts of stearic acid 2-[4-(phenylmethoxy)phenyl]ethyl ester were mixed, and heated to melt, to obtain a molten mixture;

20 parts of a self-emulsifying polyurethane prepolymer and 30 parts of ethyl acetate were added to the molten mixture, and the resulting solution was used as the oil phase; the oil phase was put into 200 parts of deionized water at a temperature of 60° C., and an emulsification was carried out by a high-speed stirring at a speed of 3000 r/min for 30 min to disperse the oil phase into tiny oil droplets to obtain an emulsion with a particle size of 0.5-5 µm;

the emulsion and 2 parts of diethylenetriamine were mixed and maintained at a constant temperature of 60° C. with stirring for 1 h, then heated to 80° C. to be subjected to curing for 2 h to obtain the slurry of microcapsule type thermochromic pigment;

(2) Preparation of a thermochromic ink:

an alkali swelling associative acrylate emulsion thickener was added to deionized water, then ammonia water with a mass concentration of 28% was dripped while stirring to adjust pH value to 8.0, and the resulting mixture were stirred for another 2 h to obtain alkali swelling associative acrylate emulsion thickener with a mass concentration of 10%;

the slurry of microcapsule type thermochromic pigment obtained in step (1) was frozen to a colored state, to obtain a colored slurry of microcapsule type thermochromic pigment;

30 parts of the colored slurry of microcapsule type thermochromic pigment, 12 parts of alkali swelling associative acrylate emulsion thickener with a mass concentration of 10%, 36.5 parts of deionized water, 0.5 parts of water-soluble phosphate MOA-3P, 0.1 parts of iodopropynyl butylcarbamate (IPBC), 0.4 part of benzotriazole, and 20 parts of glycerin were mixed, then 0.3 parts of triethanolamine was added to adjust the pH value to 8.0, and then 0.5 parts of an organic silicone defoamer was added and stirred for 0.5 h to obtain the thermochromic ink.

Figure 5:
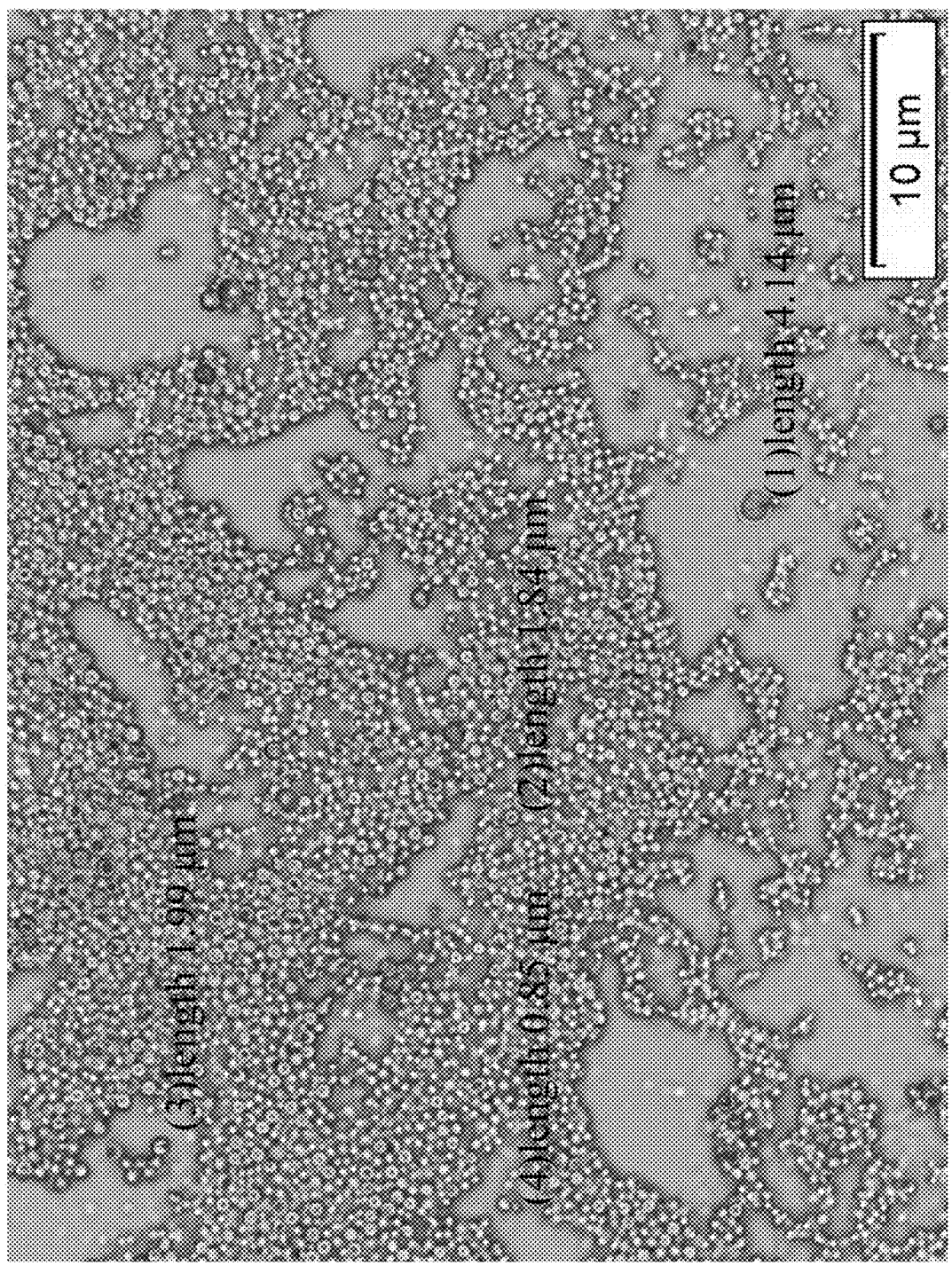
FIG. 5 is an optical microscope image of the thermochromic ink obtained in Example 3.

The thermochromic ink slide glass sample obtained in this example was characterized by an optical microscope, wherein the thermochromic ink slide glass sample was prepared by diluting the thermochromic ink obtained in this example to 5 times with deionization water, and then applying the diluted thermochromic ink onto the slide glass. The results were shown in FIG. 5. Four of the microcapsules were tested for their particle sizes, and they were 4.14 µm, 1.84 µm, 1.99 µm and 0.85 µm, respectively. It can be seen that the morphology of the microcapsule type thermochromic pigment in the thermochromic ink obtained in this example was regularly shaped sphere with an excellent dispersion, and had a relatively uniform particle size distribution.

Figure 6:
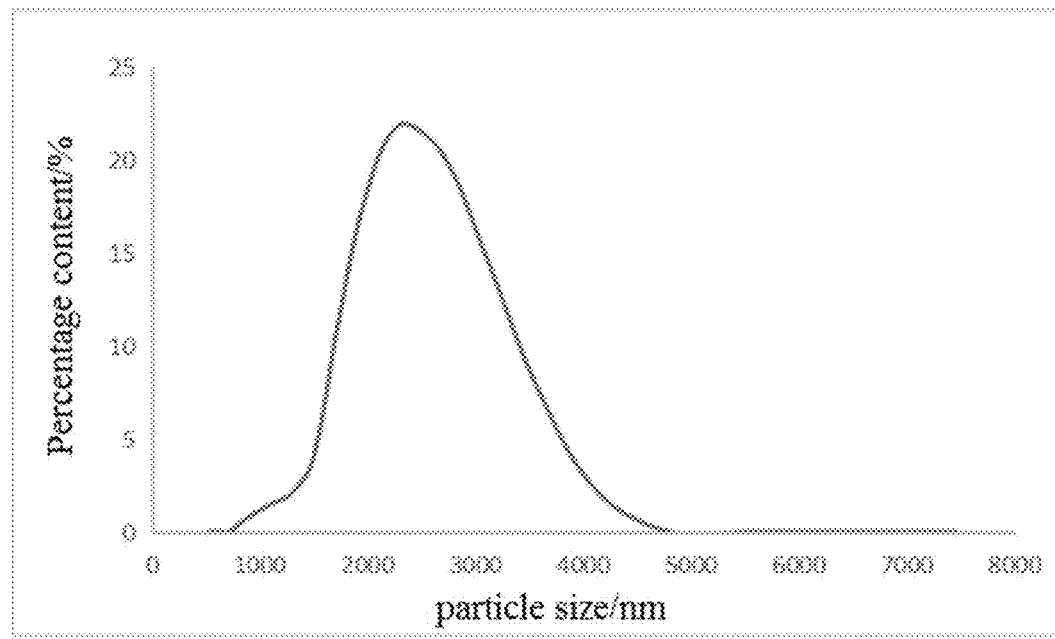
FIG. 6 is a diagram of particle size distribution of the microcapsule type thermochromic pigment obtained in Example 3.

The particle size of the microcapsule thermochromic pigment in the slurry of microcapsule type thermochromic pigment obtained in step (1) of this example was tested by a laser particle size analyzer, and the result was shown in FIG. 6. The particle size of the microcapsule thermochromic pigment was 0.5-5 and the average particle size was 2.48 µm.

The microcapsule type thermochromic pigment obtained in this example was a reversible thermochromic pigment, which can be adjusted to red or colorless by changing temperature, and the complete color-disappeared temperature was 58° C., and the complete color-appeared temperature was −18° C.

Comparative Example 1

The thermochromic inks obtained in Examples 1 to 3 were evenly applied onto white A4 paper, and then dried in a dark room to obtain a ink-coated sample; the ink-coated sample was subjected to irradiation treatment by high-pressure xenon arc lamp which was used as a standard artificial light source (there was no color difference between the A4 paper samples after being coated with the same color ink), and half of the paper samples were covered with aluminum plates, and only the uncovered half was allowed to be irradiated. The samples were placed at a distance of 20 to 30 cm from the light source (the distances were equal in each measurement), and the test was carried out at an environment temperature below 40° C. The color of the two parts (being irradiated and being not irradiated) was observed every 6 hours, 12 hours, n days (n=1,2,3, . . .) until the color difference between the two parts can be seen with the naked eye, and the observation time was record at this time.

The blue, black and red thermal erasable pens made by Xiamen Tongan Yonghengguan Industry and Trade Co., Ltd. (the color paste used by the Xiamen Tongan Yonghengguan Industry and Trade Co., Ltd. was produced by Beijing Moyike Technology Co., Ltd., namely the thermochromic paste disclosed in patent CN102807853; and a thermal erasable pen was manufactured with the ink prepared from above thermochromic paste) were taken for the test and the light resistance of the ink thereof were tested according to the above method.

The blue, black and red rubbing pens of Pilot on the market (the ink was disclosed in patent CN102713762) were taken for the test, and the light resistance of the ink thereof were tested according to the above method.

The test results were shown in Table 1.

TABLE 1

Test results of the light resistance

|  | Color-disappeared time for Blue ink | Color-disappeared time for Black ink | Color-disappeared time for Red ink |
|---|---|---|---|
| Patent CN102807853 | 12 h | 3 day | 1 day |
| Patent CN102713762 | 2 day | 4 day | 2 day |
| The present disclosure | 4 day | 6 day | 4 day |

It can be seen from Table 1 that the light resistance of the thermochromic ink provided by the present disclosure was far better than that of the prior art, and the color-disappeared phenomenon only occurs when being exposed to light for more than 4 days.

Comparative Example 2

Figure 7:
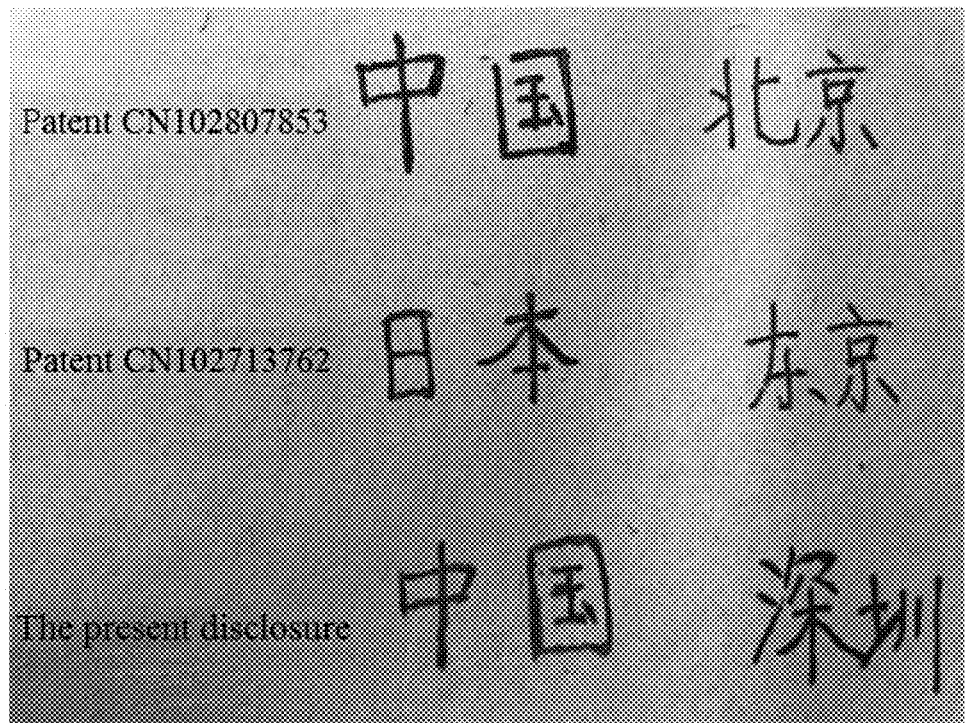
FIG. 7 is a diagram of the handwriting written in the thermochromic ink obtained in Example 1 and inks disclosed in patents CN102713762 and CN102807853.

A thermal erasable pen was manufactured with the thermochromic ink obtained in Example 1 according to the conventional method, and was used to write "中国" on the paper; while a common blue pen was used to write "深圳" next to "中国", as shown in FIG. 7. The blue Frixion manufactured with the thermochromic ink disclosed in patent CN102713762 (the blue Pilot Frixion was made by Corporation of Japan, and purchased from a stationery store) was used to write "日本"; while a common blue pen was used to write "东京", next to "日本", as shown in FIG. 7. The thermal erasable pens manufactured with thermochromic ink disclosed in patent CN102807853 (the thermal erasable pens were provided by Xiamen Tongan Yonghengguan Industry and Trade Co., Ltd.; and were manufactured with the ink prepared with the color paste produced by Beijing Moyike Technology Co., Ltd.) was used to write "中国", while a common blue pen was used to write "北京" next to "中国", as shown in FIG. 7.

Figure 8:
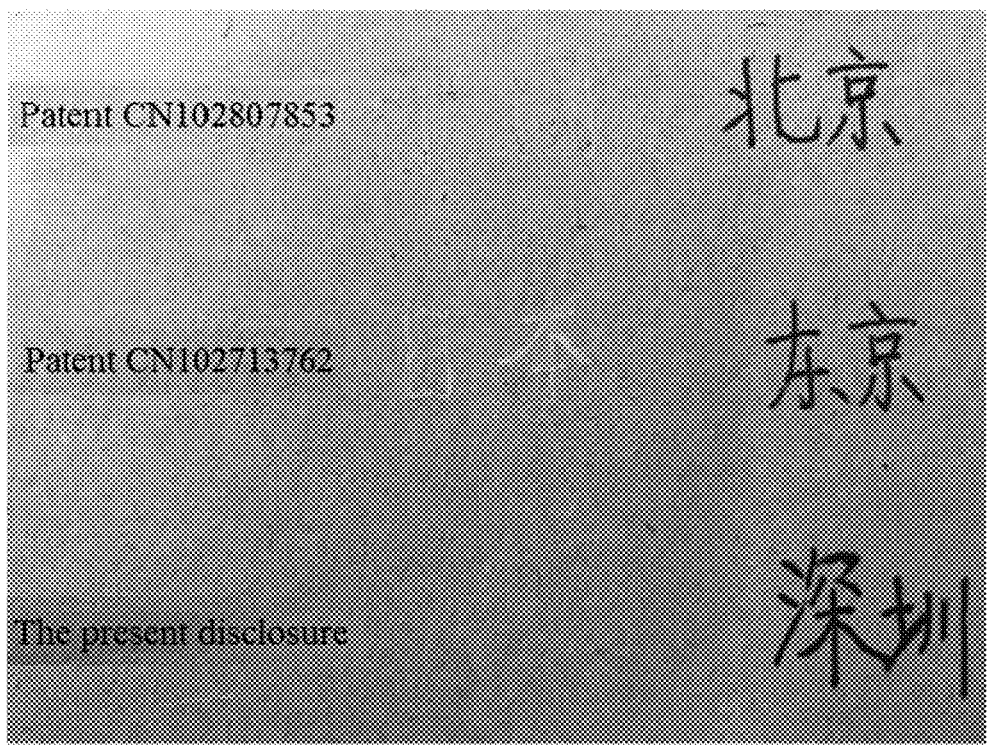
FIG. 8 is a diagram of the handwriting written in the thermochromic ink obtained in Example 1 and inks disclosed in patents CN102713762 and CN102807853 after thermal decolorization.

The paper was subjected to thermal decolorization to decolor the handwriting written with the three thermal erasable pens, and the handwriting after the decolorization was shown in FIG. 8. It can be seen from FIG. 8 that for the handwriting written by thermal erasable pens manufactured with the thermochromic ink disclosed in patents CN102713762 and CN102807853 white marks were still left after thermal decolorization, while for the handwriting written with ink in Example 1 of the present disclosure no traces were left after thermal decolorization.

The above are only the preferred embodiments of the present disclosure. It should be pointed out that for those skilled in the art, without departing from the principle of the present invention, several improvements and modifications can be made, and these improvements and modifications should also be regarded within the protection scope of the present invention.

What is claimed is:
1. A microcapsule type thermochromic pigment, comprising a core material and a wall material wrapping the core material,
wherein the core material comprises the following components: a leuco dye, a developer, a stearic acid 2[4-(phenylmethoxy)phenyl]ethyl ester and an antioxidant the antioxidant is antioxidant 168;
the wall material is self-emulsifying polyurethane or self-emulsifying epoxy resin;
the microcapsule type thermochromic pigment is prepared by the method comprising the following steps:
mixing raw materials of the core material, and then melting to obtain a molten mixture;
mixing the molten mixture with raw material of the wall material and a cosolvent, then adding to water, subjecting them to an emulsification, to obtain an emulsion, wherein the raw material of the wall material is self-emulsifying polyurethane prepolymer or self-emulsifying epoxy resin prepolymer; and
mixing the emulsion with a crosslinking-curing agent and subjecting the resulting mixture to a curing to obtain a microcapsule type thermochromic pigment in the slurry;
wherein the cosolvent is ethyl acetate or chloroform; and the crosslinking-curing agent is selected from the group consisting of diethylenetriamine, ethylene diamine, triethylene tetraamine, tetraethylene pentamine or 593 curing agent.
2. The microcapsule type thermochromic pigment according to claim 1, wherein the core material comprises the following components in parts by weight: 3-10 parts of the leuco dye, 5-13 parts of the developer and 28-32 parts of stearic acid 2-[4-(phenylmethoxy) phenyl] ethyl ester.

3. The microcapsule thermochromic pigment according to claim 1, wherein the amount of the antioxidant in the core material is 0.5-2 parts by weight.

4. The microcapsule type thermochromic pigment according to claim 1, wherein the particle size of the microcapsule type thermochromic pigment is 0.5-5 μm.

5. A method for preparing the microcapsule type thermochromic pigment according to claim 1, comprising the following steps:
mixing raw materials of the core material, and then melting to obtain a molten mixture;
mixing the molten mixture with raw material of the wall material and a cosolvent, then adding to water, subjecting them to an emulsification, to obtain an emulsion, wherein the raw material of the wall material is self-emulsifying polyurethane prepolymer or self-emulsifying epoxy resin prepolymer; the cosolvent is ethyl acetate or chloroform; and
mixing the emulsion with a crosslinking-curing agent and subjecting the resulting mixture to a curing to obtain a microcapsule type thermochromic pigment in the slurry; the crosslinking-curing agent is selected from the group consisting of diethylenetriamine, ethylene diamine, triethylene tetraamine, tetraethylene pentamine or 593 curing agent.

6. The method according to claim 5, wherein the emulsification is carried out at a temperature of 60-70° C., and the particle size of the emulsion is 0.5-5 μm.

7. The method according to claim 5, wherein a mass ratio of the leuco dye to the raw material of the wall material, the cosolvent and the crosslinking-curing agent is 5-13:18-22:28-32:2-3.

8. A thermochromic ink, comprising the microcapsule type thermochromic pigment of claim 1.

9. The thermochromic ink according to claim 8, comprising the following components in parts by weight: 28-32 parts of a slurry of microcapsule type thermochromic pigment, 10-13 parts of a thickener; 0.3-0.6 parts of a lubricant, 0.1-0.2 parts of a biocide mildewcide, 0.2-0.5 parts of a rust and corrosion inhibitor, 18-22 parts of a moisturizer, 0.3-0.6 parts of a defoamer, 35-38 parts of water and 0.1-0.5 parts of a pH adjuster, wherein the amount of the microcapsule type thermochromic pigment in the slurry of microcapsule type thermochromic pigment is 20-30 wt %.

10. A use of the microcapsule type thermochromic pigment according to claim 1 in thermal erasable pens, rubbing pens, friction vanishing pens, friction, thermal decolorization pen and high temperature decolorization pen.

* * * * *